United States Patent [19]

Otake et al.

[11] Patent Number: 4,748,509

[45] Date of Patent: May 31, 1988

[54] FOCUSING CONTROL AND INDICATION OF INFORMATION RELATING TO AN OBJECT

[75] Inventors: Yoshichi Otake, Kamakura; Kaichiro Nomoto, Tokyo, both of Japan

[73] Assignee: Victor Company of Japan, Ltd., Japan

[21] Appl. No.: 98,035

[22] Filed: Sep. 17, 1987

[30] Foreign Application Priority Data

Sep. 18, 1986 [JP] Japan .................... 61-220540
Oct. 2, 1986 [JP] Japan .................... 61-234954
Oct. 2, 1986 [JP] Japan .................... 61-234953

[51] Int. Cl.$^4$ .................................. G03B 3/10
[52] U.S. Cl. ................................ 358/227; 354/400
[58] Field of Search ........ 354/400, 402, 195.1–195.13; 352/140; 355/56, 59; 358/227; 350/429

[56] References Cited

U.S. PATENT DOCUMENTS

| | | | |
|---|---|---|---|
| 3,076,396 | 2/1963 | Mahn | 354/195.13 |
| 3,541,941 | 11/1970 | Barr et al. | 354/195.1 |
| 3,735,686 | 5/1973 | Brewer et al. | 354/400 |
| 4,043,642 | 8/1977 | Hirose et al. | 354/195.1 X |
| 4,083,057 | 4/1978 | Quinn | 352/140 X |
| 4,161,756 | 7/1979 | Thomas | 352/140 X |
| 4,290,679 | 9/1981 | Vockenhuber | 354/195.1 |
| 4,299,457 | 11/1981 | Ducommun | 354/195.13 X |
| 4,332,444 | 6/1982 | Nozawa et al. | 354/195.13 X |
| 4,477,164 | 10/1984 | Nakai et al. | 354/286 |
| 4,531,158 | 7/1985 | Murakami et al. | 358/227 |
| 4,532,553 | 7/1985 | Brill | 358/227 X |
| 4,611,244 | 9/1986 | Hanma et al. | 358/227 |
| 4,697,891 | 10/1987 | Kawai | 350/429 |
| 4,697,898 | 10/1987 | Wakaboyashi | 354/195.13 X |

FOREIGN PATENT DOCUMENTS

31932 2/1984 Japan .................... 354/195.11

*Primary Examiner*—W. B. Perkey
*Attorney, Agent, or Firm*—Lowe, Price, LeBlanc, Becker & Shur

[57] ABSTRACT

A video camera with an optical system including a zoom lens system and a rear lens system provided therebetween wherein focusing is performed by varying the distance between the rear lens system and an imaging pickup device of the video camera. The video camera further includes a first sensor for sensing the position of the rear lens system to detect a relative distance between the rear lens system and the image pickup device, a second sensor for sensing the position of the zoom lens system to detect a focal length of the optical system. An arithmetic unit provided in the video camera calculates a distance to an object on the basis of the detected relative distance and the detected focal length and, in response to zooming operation, calculates a relative distance between the rear lens system and the image pickup device on the basis of the calculated distance to the object and the focal length detected by the second sensor. The arithmetic unit generates an error signal on the basis of the difference between the calculated relative distance and the relative distance detected by the first sensor and controls the position of the rear lens system on the basis of the generated error signal.

9 Claims, 12 Drawing Sheets

TABLE n (n = 0 ~ 31)

| DISTANCE CODE | 0 | 1 | 2 | 3 | 4 | 5 | ..... | 62 | 63 |
|---|---|---|---|---|---|---|---|---|---|
| REAR LENS POSITION | $x_0$ | $x_1$ | $x_2$ | $x_3$ | $x_4$ | $x_5$ | ..... | $x_{62}$ | $x_{63}$ |

| CONTACT CODE 2 1 0 | TYPE OF CONVERSION LENS |
|---|---|
| H H L | A |
| H L H | B |
| H L L | C |
| L H H | D |
| L L H | E |
| L L L | F |

FOCUSING CONTROL AND INDICATION OF INFORMATION RELATING TO AN OBJECT

BACKGROUND OF THE INVENTION

The present invention relates generally to focusing control and indication of information relating to an object and so on, and may be applicable particularly to vide cameras.

Known is a video camera having a zooming apparatus for allowing selection between an automatic focus mode and a manual focus mode, which zooming apparatus comprises a front lens system, a rear lens system, and a zoom lens system provided therebetween. Various types of zooming apparatus have been developed theretofore. One previous arrangement is that in the manual focus mode the front lens system is moved in the directions of the axis of the zooming apparatus by manual rotation of a focus ring after the rear lens system is moved to and fixed at a predetermined position and in the automatic focus mode the rear lens system is automatically moved in the same directions after the front lens system is moved up to a predetermined position. On the plus side, defocusing does not occur during zooming because the rear lens system is kept at the predetermined position and on the other hand this requires that two focusing mechanisms are provided for the front and the rear lens systems, respectively, resulting in a complex arrangement.

Another known approach is that in the automatic focus mode and the manual focus mode only the rear lens system is moved for focus adjustment so that its arrangement becomes simple. However, this approach provides a disadvantage that difficulty is encountered to keep the object in focus in the case that the zooming operation is performed after focused to the object which is located at a finite distance from the video camera. The reason of the off-focusing will be described with reference to FIG. 5 which is a graphic diagram showing the relationship between the focal length and the rear lens system position on zooming in the focusing state. If taking a picture of an object at 2 meter's distance under the condition that a focal length is fa, the focusing state can be obtained by positioning the rear lens system to xa (point A). When the zoom-down is then performed so that the focal length becomes fc, the rear lens system position is not shifted to xb (point B) and remains at xa (point C), resulting in the off-focusing.

In addition, such a zooming apparatus in which the focusing operation is effected by moving only the rear lens system has a disadvantage in that it is difficult to accurately indicate the distance to the object because the distance to the focused object is determined by the position of the zoom lens unit besides the rear lens system position. This disadvantage causes a poor operativity.

Furthermore, an important problem in optical systems relates to the need for focusing control when a conversion lens is mounted thereto. Generally, the focal length is changed in response to the mounting of a conversion lens such as telephoto conversion lens and wide-angle conversion lens, and therefore this requires to a further adjustment to again bring the object into focus and is troublesome. Thus, a further improvement would be required from the view point of elimination of the additional trouble and accurate image pickup.

SUMMARY OF THE INVENTION

It is therefore an object of the present invention to provide a new and improved optical system which is simple in structure because the zooming is effected only by movement of the rear lens system or the image pickup device is moved for zooming and which is capable of removing the focus slippage during zooming and accurately indicating information relating to the distance to the object, and accurately effecting an image pickup irrespective of attachment of a conversion lens.

In accordance with the present invention, there is provided a video camera with an optical system including a zoom lens system and a rear lens system provided therebetween wherein focusing is performed by varying the distance between the rear lens system and an imaging pickup device of the video camera, comprising: first sensor means for sensing the position of the rear lens system to detect a relative distance between the rear lens system and the image pickup device and for producing a first detection signal indicative of the detected relative distance; second sensor means for sensing the position of the zoom lens system to detect a focal length of the optical system and for producing a second detection signal indicative of the detected focal length; drive means for driving the rear leans system; and control means responsive to the first and second detection signals from the first and second sensor means for calculating a distance to an object on the basis of the detected relative distance and the detected focal length, detecting a zooming operation of the optical system on the basis of the second signal produced by the second sensor means, and, in response to the detection of the zooming operation, calculating a relative distance between the rear lens system and the image pickup device on the basis of the calculated distance to the object and the focal length detected by the second sensor means, the control means generating a control signal to supplying it to the drive means to move the rear lens system so that the relative distance detected on the basis of the signal from the first sensor means becomes equal to the calculated relative distance.

Preferably, the video camera further includes second control means for detecting the attachment of a conversion lens to said optical system, reading information relating to the attached conversion lens, and producing a second control signal on the basis of the read information to supplying it to the drive means so that the position of the rear lens system is controlled to bring the optical system with the conversion lens into the focus state. The second control means calculates a resultant focal length of the optical system and the conversion lens on the basis of the magnification of the conversion lens and determines the controlled amount of the rear lens system on the basis of the calculated resultant focal length.

The video camera has indication means for indicating the distance to the object calculated by the control means. Preferably, the video camera further includes third sensor means for sensing a lens opening degree of the optical system to generate a third detection signal indicative of the sensed opening degree and second control means responsive to the first to third detection signals for calculating a depth of field to produce a signal indicative of the calculated depth of field. The indication means further indicates the calculated depth of field in response to the signal from the second control means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
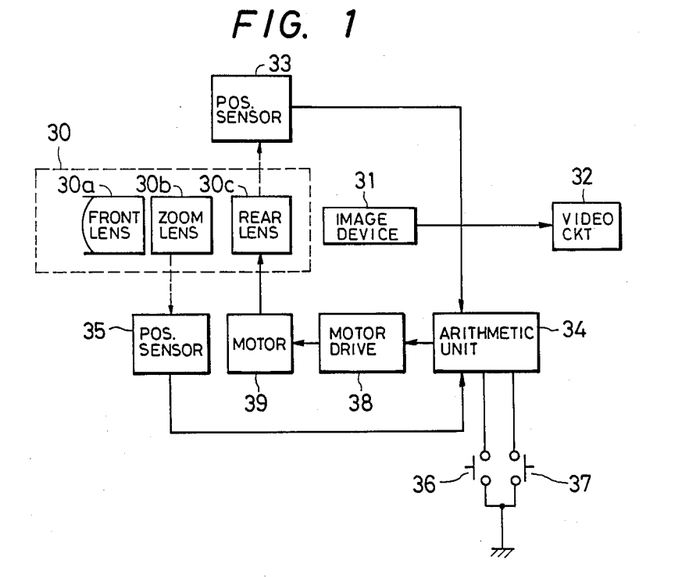
FIG. 1 is a block diagram showing a first embodiment of a zooming apparatus according to the present invention.

Referring now to FIG. 1, there is schematically illustrated a first embodiment of a zooming apparatus according to the present invnetion, the zooming apparatus including an optical lens system 30 which comprises a front lens system 30a, a zoom lens system 30b and a rear lens system 30c. The optical lens system 30 is optically coupled to an image pickup device 31 such as charge-coupled device (CCD), so that a light beam having optical information relating to an object taken by the video camera reaches the image pickup device 31 after passed through the optical lens system 30 and an image is focussed thereon. The image pickup device 31 generates an electrical signal by optoelectric conversion and the produced electrical signal is supplied to a video circuit 32 where a video signal is produced.

Figure 2:
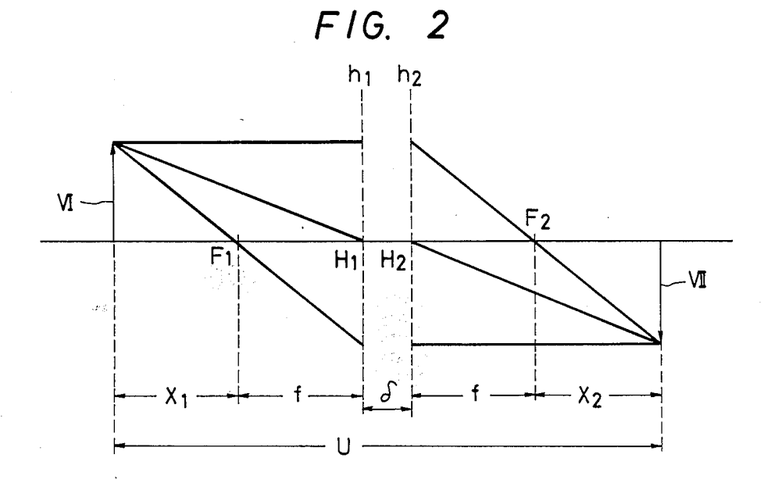
FIG. 2 is an illustration of the optical relationship between an object and an image.

Here, assuming the optical lens system 30 to be a single lens, the relationship between the object VI and the image VII is as shown in FIG. 2 wherein the references H1 and H2 respectively represent first and second principal points, h1 and h2 respectively represent first and second principal planes, F1 and F2 respectively designate first and second focal points, f is the focal length, x1 represents the distance from the first focal point F1 to the object VI, x2 is the distance from the second focal point F2 to the image VII, and U is the distance to the object VI, i.e., the distance between the object VI and the imaged position. The value x2 corresponds to the movement distance of the rear lens system 30c with respect to the image pickup device 31, i.e., the relative distance between the rear lens system 30c and the image pickup device 31, and hence is hereinafter referred to as the movement distance x2 of the rear lens system 30c.

The distance δ between the first and second principal points H1, H2 can be expressed as a function of the focal length f such as the following equation.

$$\delta = a0 + a1 \cdot f + a2 \cdot f^2 + a3 \cdot f^3$$

In FIG. 2, the following image-formation equation can be obtained with respect to the focal points.

$$x1 \cdot x2 = f^2 \quad (1)$$

Furthermore, it is obvious from the figure that the following equation can be obtained.

$$x1 + x2 + 2 \cdot f + \delta = U \quad (2)$$

From the equations (1) and (2) the following equations can be obtained.

$$U = g2(f, x2) = x2 + 2 \cdot f + \delta + f^2/x2 \quad (3)$$

$$x2 = g1(f, U) = \frac{1}{2}\{-(\delta + 2 \cdot f - U) \quad (4)$$

$$- \sqrt{(\delta + 2 \cdot f - U)^2 - 4 \cdot f^2}\}$$

Turning back to FIG. 1, a first position sensor illustrated at 33 detects the position of the rear lens system 30c to generate a first detection signal indicative of a movement distance x2 of the rear lens system 30c, i.e., the relative distance between the rear lens system 30c and the image pickup device 31, and the generated first detection signal is supplied to an arithmetic unit 34. On the other hand, a second position sensor illustrated at 35 detects the position of the zoom lens system 30b and generates a second detection signal representative of the focal length f, which is varied in accordance with the position of the zoom lens system 30b. The generated second detection signal is also supplied to the arithmetic unit 34. In practice, the respective first and second position sensors 33, 35 may comprise potentiometer-type trnasducers, each including a resistor with a continuously adjustable sliding contact, and the output signals thereof are supplied to the arithmetic unit 34 after A/D converted. It is also appropriate that an optical encorder is used for the position sensors 33, 35. In this case, the A/D converter is not required.

Figure 3A:
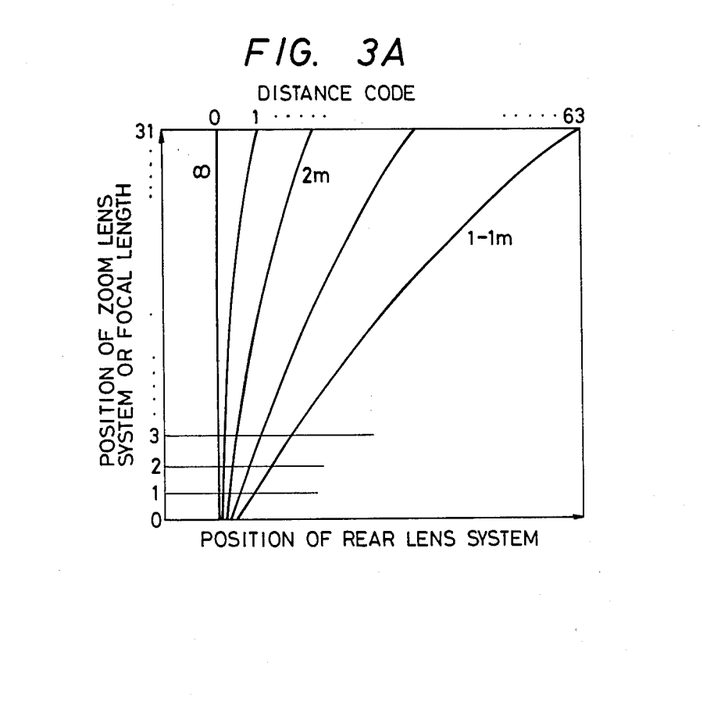
FIG. 3A is an illustration of a three-dimensional map showing the relationship among the distance to the object, the position of the rear lens system and the position of the zoom lens system.
Figure 3B:
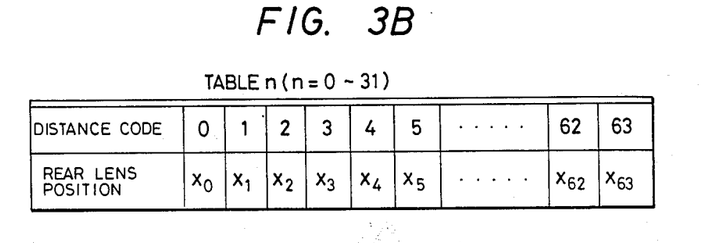
FIG. 3B shows a lookup table made in accordance with the three-demensional map of FIG. 3A.

The arithmetic unit 34 is connected to first and second switches 36 and 37 for manual focusing whereby the rear lens system 30c is movable in the directions of the axis of the optical lens system 30. That is, the arithmetic unit 34, in response to the manipulation of the first or second switch 36, 37, produces a control signal and supplies it to a motor driver 38 to drive a motor 39 so that the rear lens system 30c is moved toward the image pickup device 31 or the zoom lens system 30b to bring the object into focus. The arithamtic unit 34 performs calculation of the equation (3) and stores the calculated value of U after the first and second switches 36, 37 are released from the manipulation and further perform calculation of the equation (4) on the basis of the stored value of U and a new data of the focal length f which is derived from a new data of the zoom lens system position at a predetermined time interval during zooming in which the zoom lens system 30b is operated, so that an error signal is produced on the basis of the difference between the rear lens system movement distance x2 obtained by the calculation of the equation (4) and the rear lens system movement distance x2 obtained by the detection of the first position sensor 33 and supplied to the motor driver 38 whereby the off-focusing due to the zooming is corrected. Here, a three-dimensional map may be used instead of the calculations the equations (3) and (4) for the purpose of speed-up of the correction. The three-dimensional map, for example, is formed as shown in FIG. 3A wherein the position of the rear lens system 30c is derived from the position of the zoom lens system 30b (divided into 32) with respect to each of 64 divisions between the closest distance and infinite distance to the object. A lookup table, as shown in FIG. 3B, may be used which is made in accordance with the three-dimensional map of FIG. 3A. The lookup table showing the relationship between the distance to the object and the position of the rear lens system is made with respect to each of the 32 focal lengths (32 zoom lens system positions).

Figure 4:
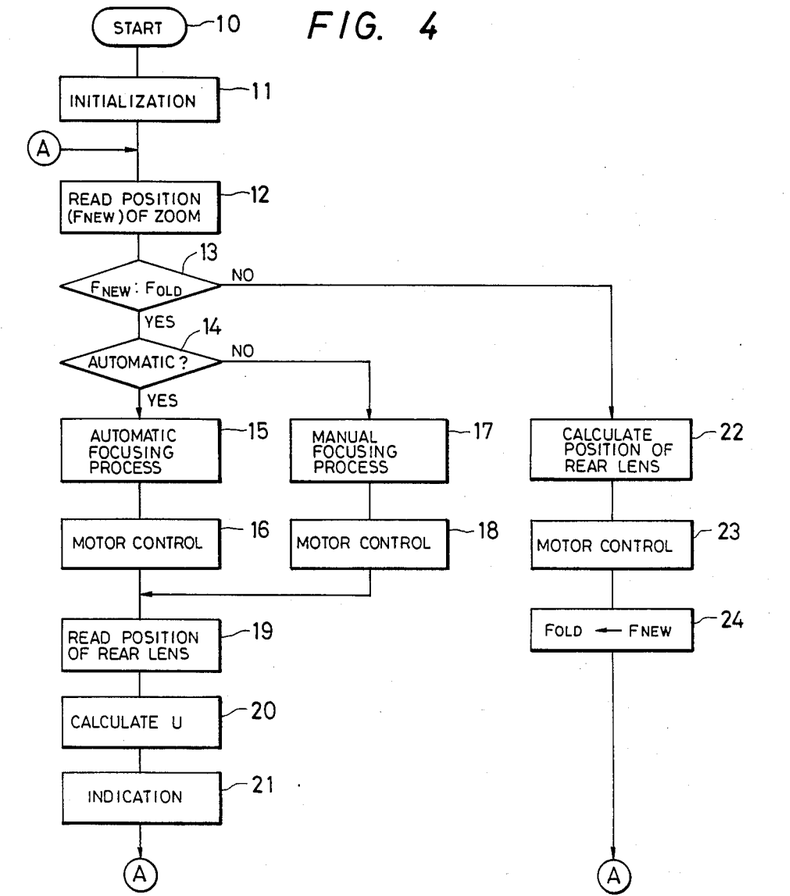
FIG. 4 is a flow chart for describing operation executed in the zooming apparatus of FIG. 1.

Operation of the optical zooming system will be described hereinbelow with reference to a flow chart of FIG. 4. This operation starts with a step 10 which is in turn followed by a step 11 for initialization. After initialization, the process advances to a step 12 to read the position of the zoom lens system 30b on the basis of a signal from the position sensor 35. The read position (FNEW) is stored in a random access memory of the arithmetic unit 34. A subsequent step 13 is executed to check whether the present zoom lens sytem position (FNEW) is compared with the previous zoom lens system position (FOLD), that is, whether a zooming is performed. This is based on the fact that the zoom lens system 30b is varied in position in response to zooming operation. If FNEW=FOLD in the step 13, the process goes to a step 14 to check whether the video camera is in the automatic focus mode. If so, the automatic focusing process is executed in a step 15 so that motor control is performed in accordance with the result of the automatic focusing process in a step 16. If not, that is, if the video camera is in the manual focus mode, the manual focusing process is performed in a step 17 and motor control is effected in accordance with the result of the manual focusing process in a step 18. Thereafter, the process proceeds to a step 19 to read the position of the rear lens system 30c on the basis of a signal from the position sensor 33 and then to a step 20 to calculate a distance U to the object on the basis of the positions of the rear lens system 30c and the zoom lens system 30b, i.e., the relative distance x2 therebetween. If required, the distance U is indicated in a step 21. The operational flow then returns to the step 12.

On the other hand, if FNEW is not equal to FOLD, that is, when a zooming operation is performed, the process goes to a step 22 where calculation is made in accordance with the equation (4) in order to produce an error signal for moving the rear lens system 30c in the focus position. The movement of the rear lens system 30c is performed in a step 23 and in a step 24 the zoom lens system position (FNEW) is stored as the previous zoom lens system position (FOLD) in the RAM of the arithmetic unit 34. After execution of the step 24 the operational flow returns to the step 12.

Figure 5:
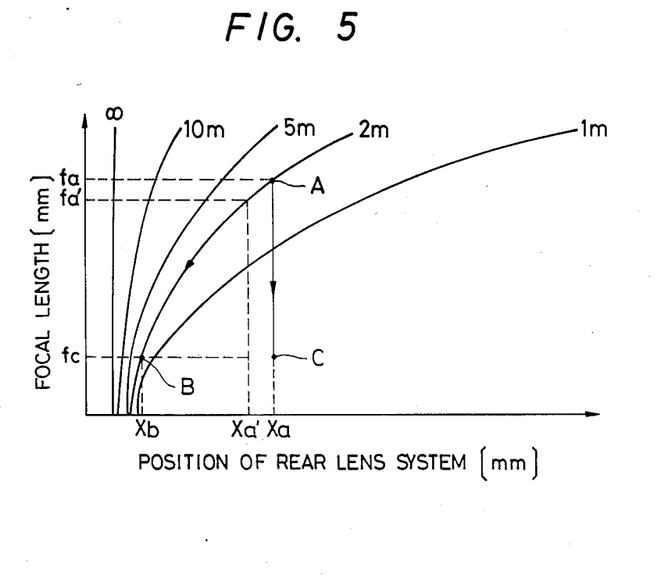
FIG. 5 is a graphic diagram showing the relationship between the focal length and the rear lens system posisiton on zooming.

The effect of the above-mentioned operation will be described hereinbelow with reference to FIG. 5. For example, in the case that focusing is performed under the conditions that the focal length is fa and the distance to the object is 2m, the arithmetic unit 34 performs the calculation of the equation (3) to obtain the distance U (=2 m). Thereafter, if the focal length becomes fa' due to zooming, the arithmetic unit 34 performs the calculation of the equation (4) and controls the motor 39 in accordance with the result of the calculation so that the rear lens system position assumes xa', resulting in prevention of the off-focusing irrespective of the zooming operation.

Figure 6:
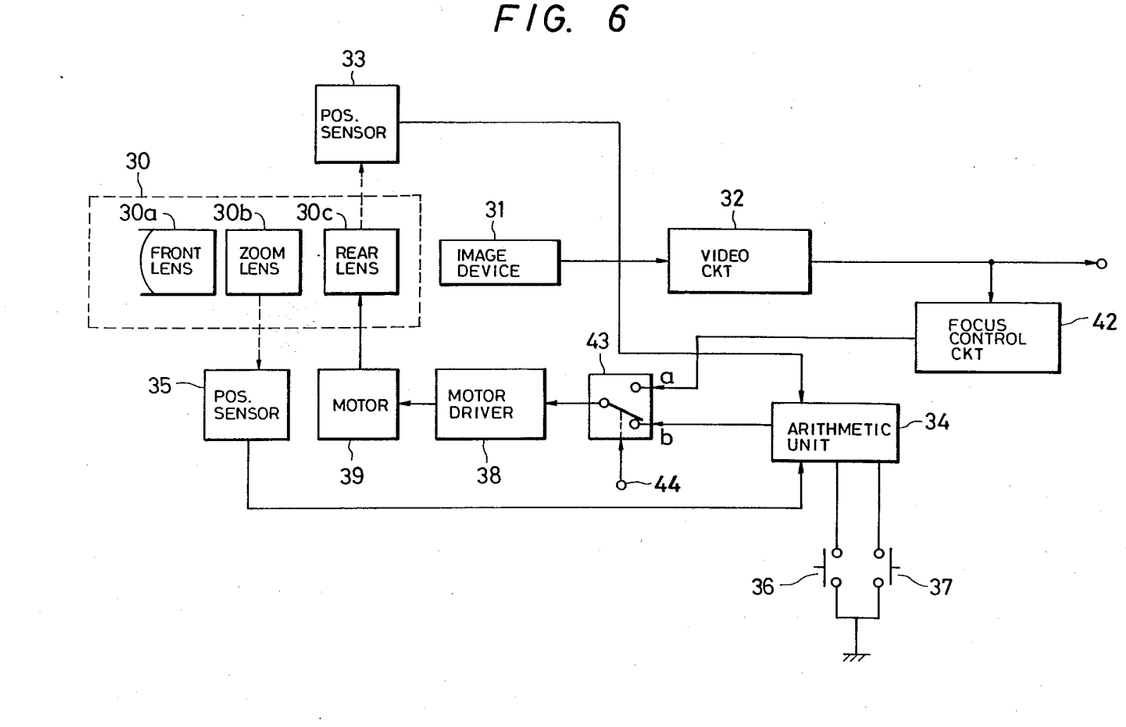
FIG. 6 shows another arrangement of the zooming apparatus

The above-described embodiment can be applicable for a zooming apparatus as shown in FIG. 6 in which parts corresponding to those in FIG. 1 are marked with the same numerals and the description thereof are omitted for brevity. In FIG. 6, a focus control circuit 42 with a known arrangement derives the high-frequency component of the video signal from the video circuit 32 to produce an error signal for moving the rear lens system 30c in the direction in which the high-frequency component is increased and to supply the error signal to a terminal a of a switch 43 in the automatic focus mode. To a terminal b thereof is supplied the error signal produced by the arithmetic unit 34, and the switch 43 performs the switching operation between the automatic focus mode and the manual focus mode in accordance with a control signal supplied from a selection circuit, not shown, through a terminal 44. Therefore, in either focus mode the error signal is supplied to the motor driver 38. In the manual focus mode the apparatus operates as the same as that shown in FIG. 1.

Figure 7:
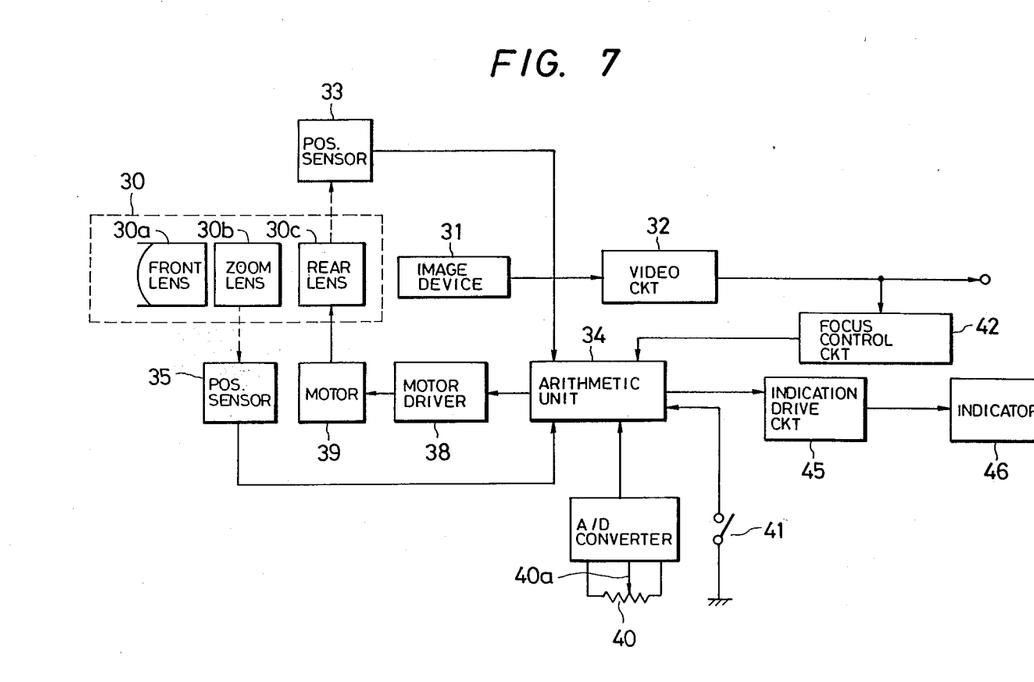
FIG. 7 is a block diagram showing a second embodiment of a zooming apparatus according to the present invention which includes an indication device for accurately indicating the distance to the focused object irrespective of zooming operation.

FIG. 7 is a block diagram showing a second embodiment of a zooming apparatus according to the present invention which is capable of accurately indicating the distance to an object irrespective of zooming operation in which parts corresponding to those in FIGS. 1 and 6 are marked with the same numerals and the description thereof will be omitted. The essential difference between the FIG. 6 zooming apparaus and the FIG. 7 zooming apparatus is that there is further provided an indication system comprising an indication drive circuit 45 and an indication device 46. Illustrated at numeral 40 is a potentiometer-type volume unit 40 for manual focus mode in which the output voltage is varied in accordance with the position of a contact 40a thereof. The output of the volume unit 40 is converted in an analog-to-digital converter 47 into a digital signal which is in turn supplied to the arithmetic unit 34. A switch 41 is provided for selection between the signal from the A/D converter 47 and the signal from the focus control circuit 42, i.e., switching operation between the automatic focus mode and the manual focus mode.

Figure 8:
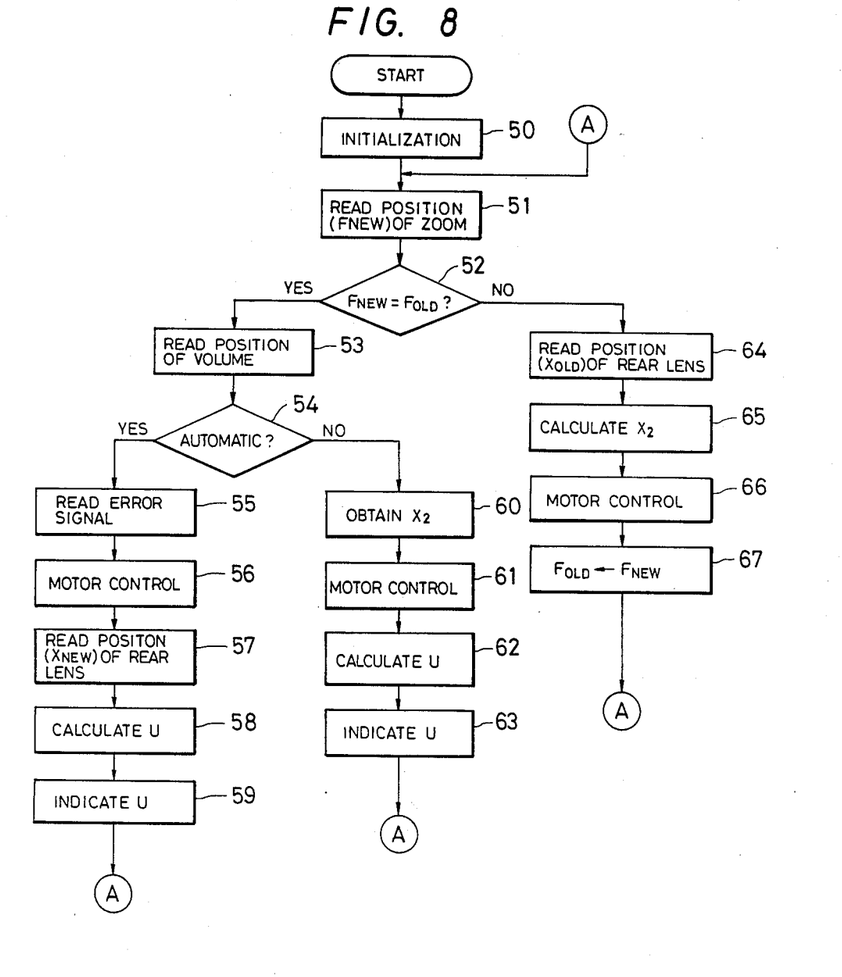
FIG. 8 is a flow chart for describing operation executed for the zooming apparatus of FIG. 7.
Figure 9A:
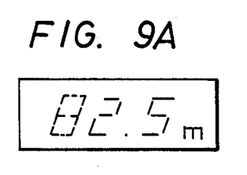
FIGS. 9A to 9D show examples of indications made in the zooming apparatus of FIG. 7.
Figure 9B:
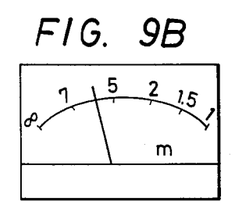
Figure 9C:
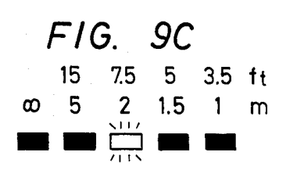
Figure 9D:
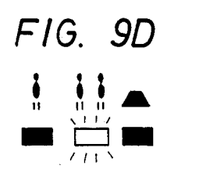

Indicating operation of the arithmetic unit 34 will be described hereinbelow with reference to a flow chart of FIG. 8. After initialized in a step 50, the process advances to a step 51 to read the position (FNEW) of the zoom lens system 30b on the basis of a signal from the position sensor 35. A subsequent step 52 is provided for checking whether the read position (FNEW) is equal to the previously read position (FOLD). If FNEW=FOLD representing that zooming is not performed, the process goes to a step 53 to read the position of the contact 40a of the volume unit 40, i.e., the output of the A/D converter 47. The step 53 is followed by a step 54 in order to check whether the video camera is in the automatic focus mode or the manual focus mode. This decision is made in accordance with detection of manipulation of the switch 41. If it is in the automatic focus mode, an error signal from the focus control circuit 42 is read in a step 55, followed by a step 56 to produce a motor control signal and to supply it to the motor drive 38. Thereafter, the position (XNEW) of the rear lens system 30c is read on the basis of a signal from the position sensor 33 in a step 57 and the distance U to the object is calculated on the basis of the zoom lens system position (FNEW) in the step 51 and the rear lens system position (XNEW) in the step 57, that is, the calculation of the equation (3) is performed. The calculated distance U to the object is indicated in a step 59. The indication drive circuit 45 produces an indication signal which is in turn supplied to the indication device 46 where indication is performed as shown in FIGS. 9A to 9D, for example. FIG. 9A shows an example in which the indication device 46 is made up of a seven-segment LED device, FIG. 9B shows an example in which it is made up of a meter-type indicator, and FIGS. 9C and 9D respectively show examples in which a plurality of indication elements (LED) are prepared and one indication element is energized in accordance with the calculated distance U, that is, the arithmetic unit 34 generates a control signal from one of ports which is selected in accordance with the value of the distance U and a LED coupled thereto is energized through a LED driver. These indication examples are well known in the indication art and therefore the detailed description are omitted.

On the other hand, if the manual focus mode is taken in the step 54, a step 60 is executed to obtain the rear lens system movement position x2 which corresponds to the constant position of the volume 40 read in the step 53, followed by a step 61 in which an error signal is produced on the basis of the difference between the obtained rear lens system movement distance x2 and the rear lens system movement distance acquired on the basis of a signal from the position sensor 33. A step 61 is executed to produce a motor control signal to bring the rear lens system 30c in the focus position and a step 62 is then executed to calculate the distance U on the basis of the zoom lens system position (FNEW) (focal length) and the rear lens system position (XNEW) (rear lens system movement distance) in accordance with the equation (3). In a subsequent step 63, an indication signal indicative of the calculated distance U is produced and supplied to the indication drive circuit.

Furthermore, If the execution of zooming is decided in the step 52, i.e., FNEW≠FOLD, a step 64 is executed to measure the position (XOLD) of the rear lens system 30c on the basis of a signal from the position sensor 33, and a step 65 is executed to perform the calculation of the equation (4) using the distance U to the object acquired in the step 58 or 62 and the rear lens system position in the step 64 to acquire the rear lens system movement distance x2. Thereafter, the process advances to a step 66 in which an error signal is produced on the basis of the acquired rear lens system movement distance x2 and the value acquired by the detection signal of the position sensor 33 so as to bring the rear lens system 30c in the focus position. In a step 67, the position of the zoom lens system 30b is stored as the previous value (FOLD). According to this embodiment, the off-focusing due to zooming is corrected and therefore the indication of the distance to the object is made possible.

Figure 10:
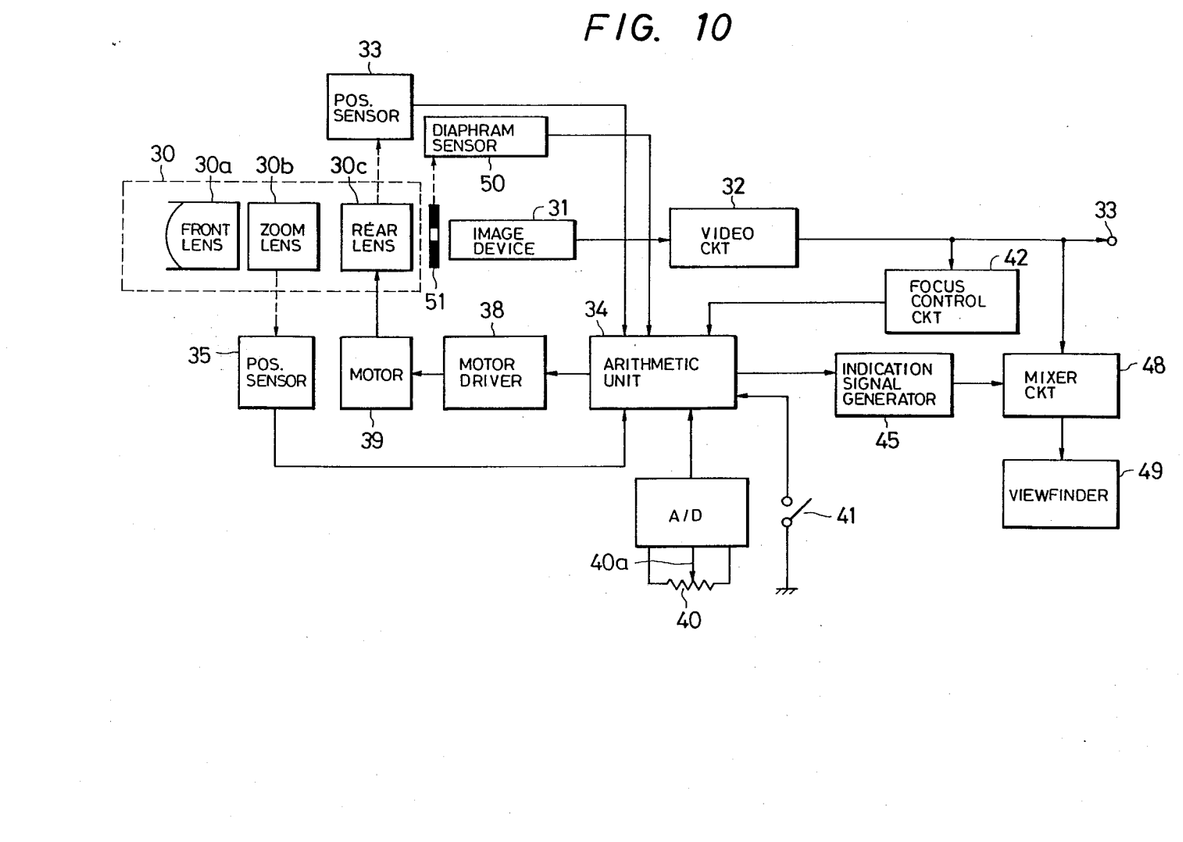
FIG. 10 is a block diagram showing a third embodiment of a zooming apparatus according to the present invention.
Figure 11A:
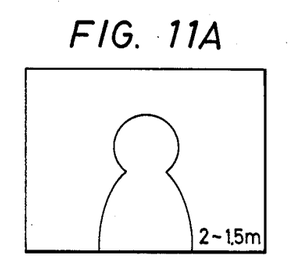
FIGS. 11A to 11F show examples of indications made in the zooming apparatus of FIG. 10.
Figure 11B:
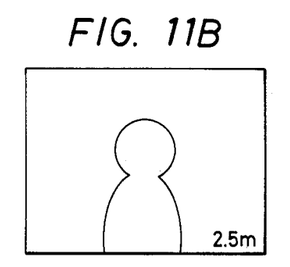
Figure 11C:
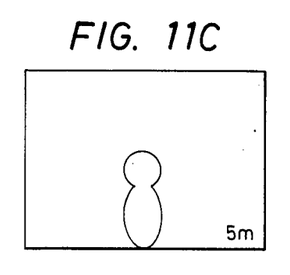
Figure 11D:
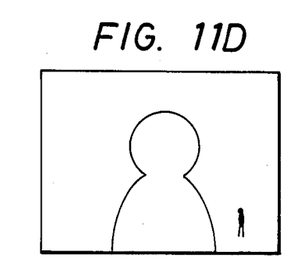
Figure 11E:
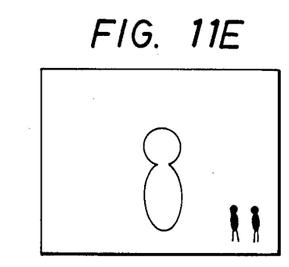
Figure 11F:
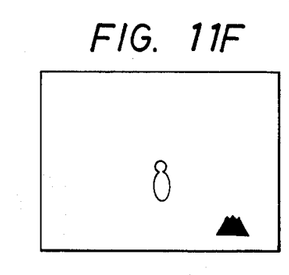

FIG. 10 is an illustration of a third embodiment of a zooming apparatus according to the present invention. This embodiment shown in FIG. 10 is similar to the FIG. 7 embodiment with the exception that the distance range in which a clear image can be obtained is indicated in an electronic viewfinder 49. Parts corresponding to those in FIG. 7 are marked with the same numerals and the description thereof are omitted. In FIG. 10, a diaphram sensor 50 is further provided to detect the opening degree of a diaphram 51 of the video camera to generate a signal indicative of the lens opening value, the lens opening indicating signal being supplied to the arithmetic unit 34 after analog-to-digital converted. The diaphram sensor 50 may be of the Hall-generator type which is known in the art. The arithmetic unit 34, in the above-mentioned step 59 or 63, derives the depth of focus from the sensed lens opening value and the focal length obtained on the basis of the sensed zoom lens system position and calculates the depth of field, in which an image is focused and sharpness is not lost, on the basis of the previously obtained distance U to the object and the derived focus depth. The arithmetic unit 34 generates a signal representative of the calculated field depth and supplies it to an indication signal generator 45' which in turn produces an indication signal to supply it to a mixer circuit 48. The indication signal generator 45' is made up of an indication integrated circuit (for example, Matsushita MN1237A) which is enabled in response to an encoded signal of the distance U. The mixer circuit adds the indication signal to the image signal supplied from the video circuit 32 and the mixed signal is supplied to the electronic viewfinder 49. As a result, for example, one of images as shown in FIGS. 11A through 11F is indicated in the electronic viewfinder 49. FIG. 11A shows an example in which a depth of field (2 to 1.5 m) is indicated therein and FIGS. 11B, 11C show examples in which a distance U to the object is merely indicated therein. FIGS. 11D to 11F show the case that an image corresponding to the distance U is made therein. For example, if the distance range is from 1 to 2 m, the image is made as shown in FIG. 11D, if it is 2 to 5 m, the image is made as shown in FIG. 11E, and if it is 5 to the infinite distance, the image is made as shown in FIG. 11F.

The depth of field in which a sharp image pickup is allowed when the distance to the object is U can be expressed as:

$$U1 = g2(x-e, f) \qquad (5)$$

$$U2 = g2(x+e, f) \qquad (6)$$

where U1 is the minimum distance to the object, U2 is the maximum distance to the object, x is the distance between the second principal surface of the lens and the imaging surface, e is depth of focus and f is the focal length.

Assuming that the maximum diameter of the image on the imaging surface in which the focusless does not occur is d(mm), the focus depth e for keeping the diameter of the image to below d is obtained by e=fd/D in accordance with the relation of D:f=d:e where D is the effective diameter of the lens. On the other hand, since D=f/F where F represents a F-number of the lens which can be measured by an iris encoder, the focus depth e can be obtained by e=d/F.

Figure 12:
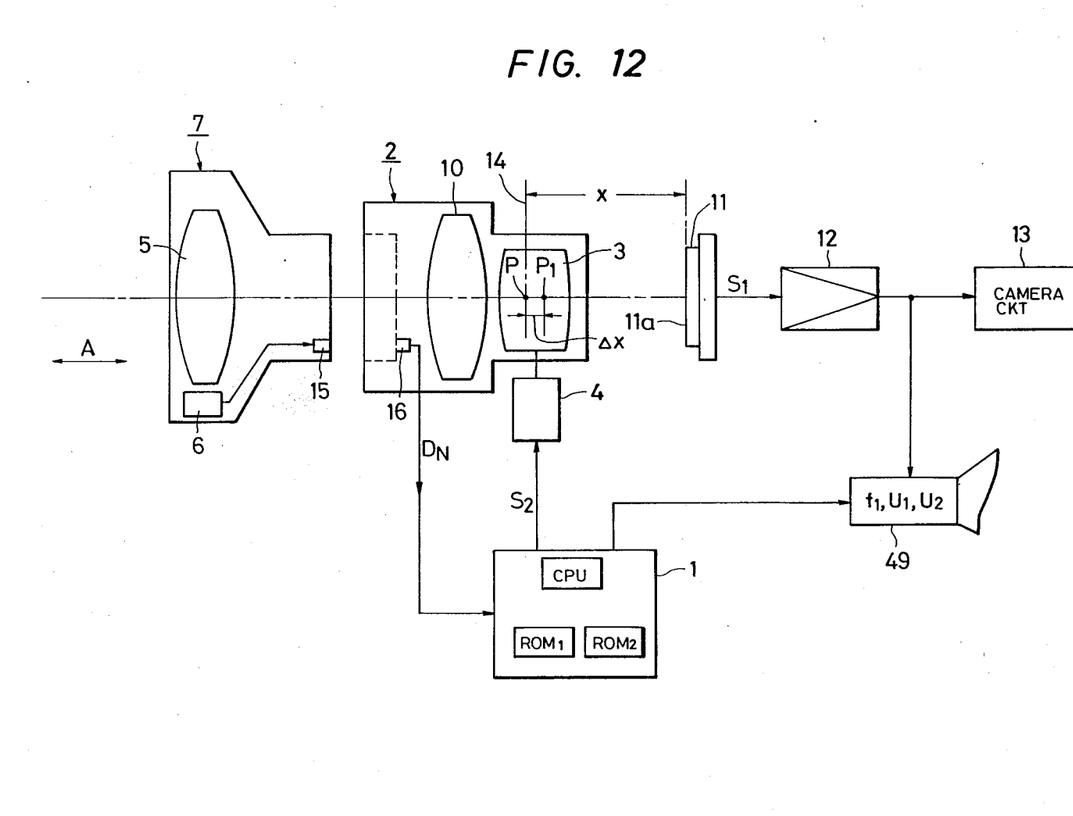
FIG. 12 is a block diagram showing a fourth embodiment of the present invention.

FIG. 12 is a block diagram showing a fourth embodiment of the present invention which compensates for variation of the focal length appeared when a conversion lens such as telephoto conversion lens and wide-angle conversion lens is attached to the optical system of the video camera. In FIG. 12, the optical system 2 comprises a first lens system 10 and a second lens system 3 which is provided behind the first lens system, the second lens system 3 being arranged so as to be moved in the directions of the optical axis of the optial system, indicated by an arrow A in the figure, by means of a pulse motor 4. The light from the object reaches an image pickup device 11 which in turn produces an image signal S1. The produced image signal S1 is supplied through a preamplifier 12 to a camera circuit 13 and further to a viewfinder 49. A control unit 1 including a microcomputer comprising a central processing unit (CPU) is provided for controlling the position of the second lens system 3 in response to variation of the focal length f of the optical system 2, i.e., supplies a control signal S2 to the pulse motor 4 so that focusing is performed, the control signal S2 being produced in accordance with information from a conversion lens unit 7 which is adapted to be detachably attached to the optical system 2. The conversion lens unit 7 comprising a conversion lens 5 and a read-only memory 6 for storing information, such as identification code and magnification, relating to the used conversion lens 5. When the conversion lens unit 7 is attached to the optical system 2, an output terminal 15 connected to the ROM 6 is coupled to an input terminal 16 which is connected to the control unit 6. The control unit 1 reads the identification code stored in the ROM 6 and refers to the identification code by using a table stored in a ROM 1 of the control unit 1 so as to check whether the attached conversion lens 5 is a previously entered conversion lens. If so, the control unit 1 further reads the magnification Dn stored in the ROM 6 and performs the focusing control in accordance with a program stored in a ROM2.

The control unit 1 initially calculates the focal length f1 on the basis of the read magnification Dn as follows.

$$f1 = Dn \times f \quad (7)$$

where f is the focal length of the optical system 2 when the conversion lens 5 is not attached thereto, that is, when the second lens system 3 is positioned to P. Thereafter, the control unit 1 determines the position P1 of the second lens system 3, at which focusing is performed, on the basis of the calculated focal length f1.

More specifically, when the second lens system 3 is positioned so that the focal length is f, the distance x between the second principal surface 14 and the image pickup surface 11a can be expressed as $x = f^2/U$ where U is the distance to the object, and in the case that the focal length is f1, the distance x1 therebetween can be obtained as $x1 = f1^2/U$. Therefore, the distance $\Delta x$ to be moved due to the variation of the focal length can be expressed as follows.

$$\Delta x = x - x1 = \frac{f^2 - f1^2}{U} \quad (8)$$

The control unit 1 supplies the control signal S2 to the pulse motor 4 so that the second lens system 3 is moved by $\Delta x$ and reaches the position P1.

If a non-entered conversion lens is attacted to the optical system 2, the above-mentioned focasing control will be stopped.

On the other hand, when the second lens system 3 is moved to the focus position P1, the control unit 1 calculates the depth of field (U1, U2) on the basis of the depth of focus as described above, and supplies an indication signal to the viewfinder 49 so that the depth of field is indicated therein.

Figure 13A:
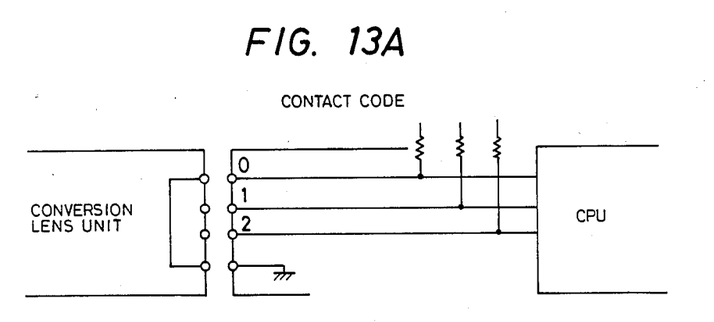
FIGS. 13A andd 13B show one example of detection of the attachment of a conversion lens.
Figure 13B:
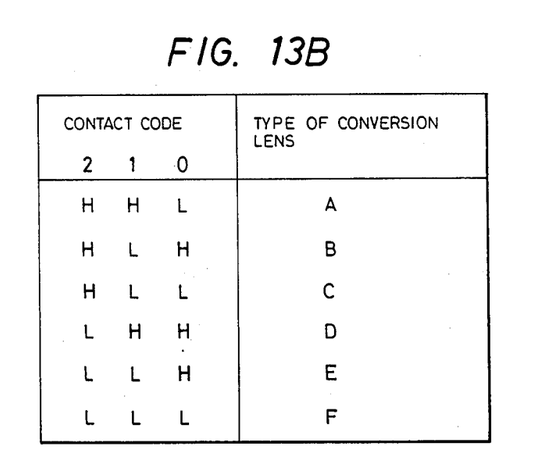

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the fourth embodiment the information relating the conversion lens is stored in the ROM 6 of the conversion lens unit 7, it is also appropriate that, as illustrated in FIGS. 13A and 13B, the connection between specific two contacts of the input terminal 16 is made in accordance with the type of the conversion lens when the conversion lens unit is attached to the optical system of the video camera and the control unit determines the typ of the conversion lens by referring to the connection information by using a table stored in a ROM. FIG. 13A shows the case that a conversion lens A is attached t the optical system of the video camera.

What is claimed is:

1. A video camera with an optical system including a zoom lens system and a rear lens system wherein focusing is performed by varying the distance between said rear lens system and an imaging pickup device of said video camera, comprising:
   first sensor means for sensing the position of said rear lens system to detect a relative distance between said rear lens system and said image pickup device and for producing a first detection signal indicative of the detected relative distance;
   second sensor means for sensing the position of said zoom lens system to detect a focal length of said optical system and for producing a second detection signal indicative of the detected focal length;
   drive means for driving said rear leans system; and
   control means responsive to said first and second detection signals from said first and second sensor means for calculating a distance to an object on the basis of the detected relative distance and the detected focal length, detecting a zooming operation of said optical system on the basis of the second signal produced by said second sensor means, and, in response to the detection of the zooming operation, calculating a relative distance between said rear lens system and said image pickup device on the basis of the calculated distance to said object and the focal length detected by said second sensor means, said control means generating a control signal to supplying it to said drive means to move said rear lens system so that the relative distance obtained by the signal from said first sensor means becomes equal to the calculated relative distance.

2. A video camera as claimed in claim 1, wherein said control means detects the zooming operation on the basis of variation of the position of said zoom lens system.

3. A video camera as claimed in claim 1, further comprising indication means for indicating the distance to the object calculated by said control means 4. A video camera as claimed in claim 1, further comprising third sensor means for sensing a lens opening degree of said optical system to generate a third detection signal indicative of the sensed opening degree, second control means responsive to said first to third detection signals for calculating a depth of field to produce a signal indicative of the calculated depth of field, and indication means is responsive to the signal from said second control means for indicating the calculated depth of field.

5. A video camera as claimed in claim 3, wherein said second control means calculates a depth of focus on the basis of the sensed lens opening degree and the detected focal length and then calculates the depth of field on the basis of the calculated distance to the object and the calculated depth of focus.

6. A video camera as claimed in claim 1, further comprising second control means for detecting the attachment of a conversion lens to said optical system, reading information relating to the attached conversion lens, and producing a second control signal on the basis of the read information to supplying it to said drive means so that the position of said rear lens system is controlled to bring said optical system with said conversion lens into the focus state.

7. A video camera as claimed in claim 6, wherein the information is the magnification of the attached conversion lens and said second control means calculates a resultant focal length of said optical system and said conversion lens on the basis of the magnification of said conversion lens and determines the controlled amount of said rear lens system on the basis of the calculated resultant focal length.

8. A video camera as claimed in claim 7, further comprising indication means for indicating the resultant focal length calculated by said second control means.

9. A video camera as claimed in claim 6, wherein said conversion lens is encased in a conversion lens unit, said conversion lens unit having memory means storing the information relating to said conversion lens and when said conversion lens is attached to said optical system, said memory means being coupled to said second control means so that the information relating to said conversion lens is read by said control means.

* * * * *